D. SMITH.
CONGEALERS FOR ICE-MACHINES.
No. 173,357. Patented Feb. 8, 1876.
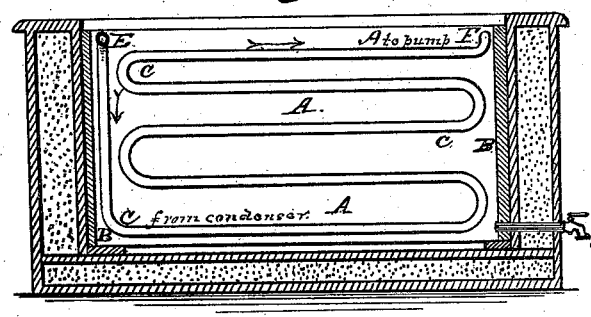
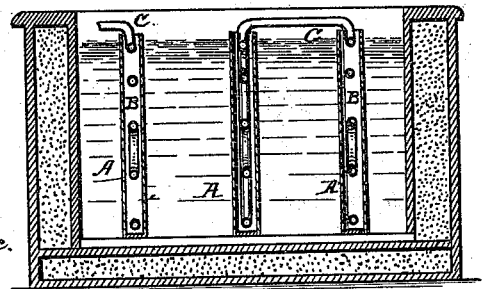
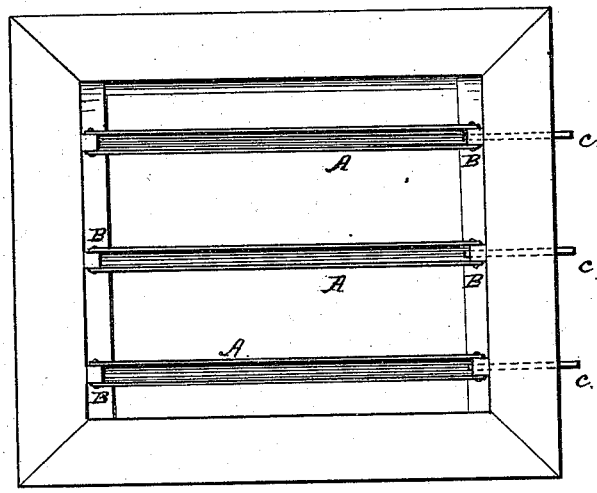
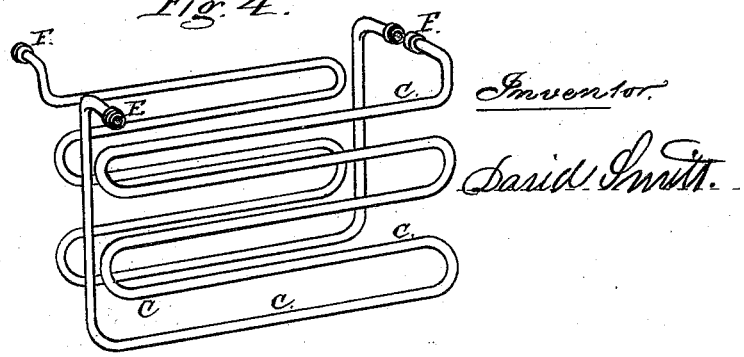
Witnesses.
G. E. Schenck
J. S. Parsons
Inventor.
David Smith

UNITED STATES PATENT OFFICE.

DAVID SMITH, OF SAN FRANCISCO, CALIFORNIA, ASSIGNOR OF ONE-FOURTH HIS RIGHT TO C. W. M. SMITH, OF SAME PLACE.

IMPROVEMENT IN CONGEALERS FOR ICE-MACHINES.

Specification forming part of Letters Patent No. 173,357, dated February 8, 1876; application filed November 4, 1875.

*To all whom it may concern:*

Be it known that I, DAVID SMITH, of the city and county of San Francisco, State of California, have invented an Improvement in Machines for the Manufacture of Ice; and I do hereby declare that the following is a full, clear, and exact description of the same, reference being had to the accompanying drawings, and to the letters marked thereon.

This invention relates to that part of an ice-machine known as the congealer; and it consists of a water-tight freezing-box constructed of thin metallic plates, within which is the layer or coil of pipe that contains and conducts the freezing agent, the space between and around the pipes being filled up with a non-congealable fluid. This box is immersed in, or surrounded by, pure water, and the ice is formed on the outside and against the sides of the box as the freezing agent passes through the pipes.

The ice is detached from the plates or the sides of the box by withdrawing the non-congealable fluid through a cock at one end of the plates, and filling the box with water of the ordinary temperature, that causes the ice to separate from the plates, so that it can be removed, as will be more fully described hereafter.

To enable others skilled in the art to which my invention most nearly appertains to make and use the same, I will now proceed to describe its construction and manner of operation.

Referring to the drawings, Figure 1 shows a vertical longitudinal section through the tank and through one of the congealer-boxes. Fig. 2 is a transverse section of the same. Fig. 3 is a plan view of the tank and the boxes with the pipes removed. Fig. 4 is a perspective view of two sections of pipe.

The congealer is constructed in the form of a long and narrow box by employing two sheets, A A, of No. 10 metal, of convenient size, say ten feet long by three and one-half feet wide. These sheets are riveted, screwed, or otherwise fastened together at the ends and bottom, with a sufficient thickness of wood, B, between them to make a tight box of proper width to receive the pipe C. These pipes are made either of lead or iron, preferably of one inch in diameter, and they enter at the top and pass back and forth to the bottom, as shown in Fig. 1, and thence to the top again, where they are connected to the pump or to the next pipes of the second box; or the pipe of each box may pass out through the tank and be connected on the outside.

The boxes are made water-tight for the purpose of holding a non-congealable liquid, as brine or chloride of calcium, for acting as a medium between the water and the congealing agent, to extract the heat from the water to be frozen, and also to cause the ice to be formed of an equal thickness over the entire surface of the iron plates.

Fig. 3 represents a plan of the tank with the boxes in place, of which Figs. 1 and 2 are sectional views. This tank is built of wood or iron, with double walls and bottom, and the space between them is filled with sawdust, charcoal, or any other non-conductor.

The congealer-boxes are placed, as shown in the drawing, at a sufficient distance from the bottom of the tank to prevent the ice forming too near the base, and to give space for the circulation of the water between the boxes, and also to permit the more perfect and convenient cleaning of such space, and of the spaces between the boxes and of the tank; and each congealer-box is provided with a waste-cock, c, through which the brine or non-congealable liquid may be drawn off.

The metal sides of the boxes do not extend entirely across the tank; but the wooden ends of the boxes, as shown at B, prevent the ice forming against the sides of the tank, and allow it to be easily detached from the congealer-plates.

In practice the tank is built to contain as many congealer-boxes as required, and these are placed in position about twenty-two inches apart. The pipes are then connected, the inlet-pipe E with the condenser, and the outlet-pipe F with the pump of the apparatus; and when it is charged with ammoniacal gas and the tank is filled with pure, clear water, and the congealer-boxes are filled with brine or chloride of calcium, the circulation of the gas begins as the pumps are put in motion.

The non-congealable liquid in the boxes is relieved of its latent heat by the expansion of the gas within the pipes, and this, by absorbing the heat from the water in contact with the iron plates, causes the ice to form on the sides of the boxes, and to increase in thickness as long as the circulation continues.

When the ice has reached the desired thickness on the sides of the congealer-boxes, it is easily detached by drawing off the non-congealable liquid from the boxes through the cocks $c$, and then filling the boxes with water at any temperature above 32° Fahrenheit. This water, which acts to raise the temperature of the plates or sides of the boxes, is afterward drawn off through the outlet-pipe at the bottom or end of the boxes, and the non-congealable liquid is pumped back again into the boxes. In this manner the brine or other liquid may be used as many times as may be desired.

A series of these congealer-boxes may be placed side by side with a sufficient water-space or distance between each one, so that when the sheets of ice are formed on them a few inches of water will remain to allow the ice to be removed from the tank with facility.

The pipes C are formed with the upper coils or layers placed nearer together than the lower coils, as shown in Figs. 1, 2, and 4, and this construction is employed to equalize the action of the gas upon the brine, and to give it the same temperature or a uniform temperature throughout the entire contents of the box without the employment of agitators or other equalizing agents.

This equalization of temperature results from the fact that the gas where it enters the coil at the bottom exerts its frigorific effect with the greatest energy, and as it passes along in its course upward becomes gradually robbed of its frigorific power, by reason of which it becomes necessary to have a uniform diminution of the spaces between the coils, in order to insure the uniform result desired at all points.

By the employment of a non-congealable liquid, in connection with the freezing agent or gas in a closed congealer, a marked beneficial and novel result is produced, as the ice is readily formed and detached from the plates without interfering with or affecting the action and circulation of the gas. The ice also can be detached in a better manner, and in much less time, than in other apparatus or processes of manufacturing ice, reducing the time required from three hours, as by the process where the pipes that carry the gas are in direct contact with the congealer-plates, to five minutes by my improved process.

It will be seen, from the above description, that the sides of the congealer-boxes are constructed with plain surfaces, on which the ice forms, and therefore the ice forms more readily, and of a much better quality, and it also requires less heat to detach it than where it forms on irregular surfaces, as in those processes where it is melted off from the congealing-surfaces by the action of hot gas.

It will be noticed, from the foregoing description, that the non-congealable liquid or brine performs its office in a state of rest; that the pipes which convey the freezing agents are removable and wholly isolated, and of a peculiar construction; that the ice is formed directly upon the freezing-sides by direct contact therewith; that the ends and bottom of the congealer are constructed of non-conducting material, and that the freezing-sides do not extend entirely to the bottom of the congealer.

Having thus fully described my invention, what I claim, and desire to secure by Letters Patent, is—

1. In combination with a proper tank, a congealer having metallic sides and wooden ends and bottom, and isolated at the bottom thereof, except at the ends, from the bottom of the tank, substantially as and for the purposes set forth.

2. The evaporating-coil C, with an increasing space downward between the pipes, substantially as and for the purposes described.

In witness whereof I have hereunto set my hand and seal.

DAVID SMITH. [L. S.]

Witnesses:
G. E. SCHENCK,
I. S. PARSONS.